(12) United States Patent
Mlakar et al.

(10) Patent No.: US 11,446,686 B2
(45) Date of Patent: *Sep. 20, 2022

(54) MULTICOLOR POWDER CENTER FOR SUPPLYING AT LEAST ONE POWDER SPRAYING DEVICE WITH DIFFERENT TYPES OF COATING POWDER AS REQUIRED

(71) Applicant: GEMA SWITZERLAND GMBH, St. Gallen (CH)

(72) Inventors: Roman Mlakar, Kreuzlingen (CH); Mark Steinemann, Elgg (CH); Marco Sanwald, Abtwil (CH); Felix Mauchle, Abtwil (CH)

(73) Assignee: GEMA SWITZERLAND GMBH, St. Gallen (CH)

( * ) Notice: Subject to any disclaimer, the term of this patent is extended or adjusted under 35 U.S.C. 154(b) by 18 days.

This patent is subject to a terminal disclaimer.

(21) Appl. No.: 16/959,980

(22) PCT Filed: Jan. 23, 2019

(86) PCT No.: PCT/EP2019/051586
§ 371 (c)(1),
(2) Date: Jul. 2, 2020

(87) PCT Pub. No.: WO2019/145339
PCT Pub. Date: Aug. 1, 2019

(65) Prior Publication Data
US 2021/0060590 A1    Mar. 4, 2021

(30) Foreign Application Priority Data

Jan. 23, 2018  (DE) .................. 102018000504.7

(51) Int. Cl.
| | | |
|---|---|---|
| B05B 7/14 | (2006.01) |
| B05C 19/06 | (2006.01) |
| B05B 12/14 | (2006.01) |

(52) U.S. Cl.
CPC ............ *B05B 7/1472* (2013.01); *B05B 12/14* (2013.01); *B05C 19/06* (2013.01); *B05B 7/1459* (2013.01); *B05B 7/1477* (2013.01)

(58) Field of Classification Search
USPC .............................. 118/308, 309, 310, 311
See application file for complete search history.

(56) References Cited

U.S. PATENT DOCUMENTS

| | | | | |
|---|---|---|---|---|
| 6,112,999 A | * | 9/2000 | Fingleton .............. | B05B 7/1404 239/112 |
| 8,567,341 B1 | * | 10/2013 | Thies .................... | B05B 7/1404 118/310 |
| 2010/0071616 A1 | * | 3/2010 | Mauchle ................ | B01D 45/12 118/308 |

FOREIGN PATENT DOCUMENTS

| | | |
|---|---|---|
| DE | 19519092 A1 | 11/1995 |
| WO | 0029124 A1 | 5/2000 |
| WO | 200029124 A1 | 5/2000 |

OTHER PUBLICATIONS

International Search Report and Written Opinion dated May 24, 2019, for corresponding PCT Application No. PCT/EP2019/051586.

(Continued)

*Primary Examiner* — Yewebdar T Tadesse
(74) *Attorney, Agent, or Firm* — Kinney & Lange, P.A.

(57) ABSTRACT

A multicolor powder center is disclosed for supplying at least one powder spraying device with different types of coating powder as required. The multicolor powder center has a first powder container for receiving a first type of coating powder, at least one second powder container for (Continued)

receiving a second type of coating powder, and at least one pump unit comprising at least one powder pump. The pressure side of the at least one powder pump is fluidically connected or can be fluidically connected to the powder inlet of a powder spraying device. The at least one pump unit and/or the powder container can be moved relative to each other such that the suction side of the at least one powder pump is fluidically connected or can be fluidically connected either to the interior of the first powder container or the interior of the at least one second powder container as required.

31 Claims, 11 Drawing Sheets

(56) References Cited

OTHER PUBLICATIONS

International Preliminary Report on Patentablility dated Dec. 9, 2019 for corresponding PCT Application No. PCT/EP2019/051586.
English Translation of International Preliminary Report on Patentablility dated Dec. 9, 2019 for corresponding PCT Application No. PCT/EP2019/051586.
German Search Report dated Nov. 22, 2021, received for corresponding German Application No. 19703017.4, five pages.

* cited by examiner

MULTICOLOR POWDER CENTER FOR SUPPLYING AT LEAST ONE POWDER SPRAYING DEVICE WITH DIFFERENT TYPES OF COATING POWDER AS REQUIRED

CROSS-REFERENCE TO RELATED APPLICATION(S)

This application is the national phase of PCT Application No. PCT/EP2019/051586 filed on Jan. 23, 2019, which in turn claims priority to German Application No. 102018000504.7 filed on Jan. 23, 2018, the disclosures of which are incorporated by reference herein in their entireties.

BACKGROUND

The present disclosure relates to a multicolor powder center for supplying at least one powder spraying device with different types of coating powder as required.

The multicolor powder center according to the present disclosure is particularly suited to supplying powder to powder spraying devices used in the electrostatic spray coating of objects with powder, in which fresh coating powder (also called "fresh powder" herein) and potentially recovered coating powder (also called "recovery powder" herein) are situated in powder containers and supplied to one or more spraying mechanisms, or powder spraying devices respectively, by a pump unit having at least one powder pump, for example in the form of a powder injector or in the form of a dense phase powder pump. The spraying mechanisms/powder spraying devices can for example be manual guns or automatic guns.

The present disclosure is based on the problem of powder coating systems and the associated powder supply devices needing to be thoroughly cleaned when a change in powder is made (changing from one type of powder to another type of powder), and particularly when changing colors (changing from powder of a first color to powder of another second color), since even just a few powder particles of the previous type of powder can result in coating errors when coating with the new type of powder.

The present disclosure solves the task of achieving the feasibility of easily realizing a quick change in powder or, respectively, realizing multicolor spray coating as efficiently as possible.

SUMMARY

Accordingly, in particular specified is a multicolor powder center for supplying at least one powder spraying device with different types of coating powder as required, wherein the multicolor powder center comprises a first powder container for accommodating a first type of coating powder and at least one second powder container for accommodating a second type of coating powder. Furthermore provided is at least one powder delivery device in the form of a pump unit having at least one powder pump, in particular a dense phase powder pump or thin stream powder pump. The pressure side of the powder pump is fluidly connected or connectable to the powder inlet of a powder spraying device such as, for example, a manual gun or an automatic powder gun.

According to one aspect of the present disclosure, provided in particular is for the at least one pump unit and/or the powder containers to be movable relative to each other such that the suction side of the at least one powder pump is fluidly connected or connectable to either the interior of the first powder container or the interior of the at least one second powder container as needed.

According to embodiments of the present disclosure, the pump unit is for example movable relative to the powder containers such that the suction side of the at least one powder pump is fluidly connected or connectable to either the interior of the first powder container or the interior of the at least one second powder container as needed.

As a result, the disclosed multicolor powder center comprising at least one pump unit movable relative to the powder containers enables an easily realized and in particular effective powder change or multicolor spray coating operation respectively. All that is necessary thereto is for the pump unit to be transferred from a first powder container to a second powder container so that the suction side of the pump unit can then be connected to the interior of the second powder container.

According to one aspect of the present disclosure, a cleaning station is further provided for cleaning the pump unit, a line system leading from the pump unit to at least one powder spraying device and/or at least one powder spraying device as required. This ad hoc cleaning particularly occurs when changing from a first type of powder to a differing second type of powder. In this context, it is conceivable for the pump unit to be movable relative to the cleaning station such that it can be cleaned in or at the cleaning station as needed and in particular flushed with cleaning compressed air. Alternatively thereto, it is conceivable for the cleaning station to be movable relative to the pump unit such that the pump unit can be cleaned in or at the cleaning station as needed and in particular flushed with cleaning compressed air.

According to embodiments of the disclosed multicolor powder center, the cleaning station and/or the pump unit itself is allocated a drive so that the cleaning station can thus be moved relative to the pump unit such that the pump unit can be cleaned in or at the cleaning station as needed and in particular flushed with cleaning compressed air.

Preferential implementations of the disclosed multicolor powder center provide for a carriage or slide assembly to be allocated to the at least one pump unit, by means of which the pump unit can be movably guided in a horizontal plane and above the powder container as well as relative to it. Alternatively or additionally thereto, a vertical guide unit can also be allocated to the pump unit for vertically moving the pump unit or parts thereof relative to the powder containers when needed.

According to embodiments of the disclosed multicolor powder center, it is provided for a drive, in particular a linear drive, to be allocated to the first powder container and/or the at least one second powder container for moving the corresponding powder container relative to the pump unit when required. Particularly conceivable in this context is for the first powder container and the at least one second powder container to each be able to be moved relative to the pump unit independently of one another.

According to embodiments of the disclosed multicolor powder center, the at least one pump unit comprises at least two powder pumps which are in particular operable independently of each other, these being arranged in the pump unit such that in a state during which the pump unit is coupled to a powder container or a cleaning station, the at least two powder pumps are each connected on the suction side to the interior of the powder container or cleaning station.

For example, it is conceivable for a first and at least one further second pump unit, each comprising at least one powder pump, in particular a dense phase or thin stream powder pump, to be provided, wherein the pump units are movable relative to the powder containers independently of one another such that the suction side of the at least one powder pump of the first pump unit and the suction side of the at least one powder pump of the at least one second pump unit are fluidly connected or connectable as needed to either the interior of the first powder container or the interior of the at least one second powder container; and/or the suction side of the at least one powder pump of the first pump unit is fluidly connected or connectable to the interior of a first of the at least two powder containers and the suction side of the at least one powder pump of the second pump unit is fluidly connected or connectable to the interior of the other of the at least two powder containers as needed.

In a further development of the latter embodiment of the disclosed multicolor powder center, the first and the at least one further second pump unit can be moved relative to each other and relative to the powder containers in at least one horizontal direction. Alternatively or additionally thereto, it can be provided for the first and the at least one further second powder container to be able to be moved relative to each other and relative to the first and the at least one second pump unit in at least one horizontal direction.

One conceivable implementation of the disclosed multicolor powder center provides for a plurality of powder containers arranged arrayed together in a matrix, wherein the at least one pump unit is movable in a first horizontal direction and in a second horizontal direction orthogonal to the first horizontal direction relative to the powder containers such that the suction side of the at least one powder pump is fluidly connected or connectable as needed to the interior of one powder container of the plurality of powder containers.

Alternatively thereto, a plurality of powder containers arranged arrayed together in a matrix can be provided, wherein the powder containers are movable in a first horizontal direction and in a second horizontal direction orthogonal to the first horizontal direction relative to the at least one pump unit such that the suction side of the at least one powder pump is fluidly connected or connectable as needed to the interior of one powder container of the plurality of powder containers.

Alternatively thereto, a plurality of powder containers arranged arrayed together in a matrix can be provided, wherein the powder containers are movable in a first horizontal direction and the at least one pump unit is movable in a second horizontal direction orthogonal to the first horizontal direction such that the suction side of the at least one powder pump is fluidly connected or connectable as needed to the interior of one powder container of the plurality of powder containers.

According to a further aspect of the present disclosure, the pump unit comprises a docking unit via which the suction side of the at least one powder pump can be fluidly connected as needed to the interior of one of the powder containers. Conceivable in this context is for the docking unit to be allocated a vertical guide unit, by means of which the docking unit can be moved in the vertical direction as needed relative to the at least one powder pump of the pump unit and the powder containers.

The present disclosure further relates to a multicolor powder center for supplying at least one powder spraying device with different types of coating powder as required, wherein the multicolor powder center comprises at least one powder container for accommodating coating powder and a pump unit having at least one powder pump, in particular a dense phase or thin stream powder pump, the pressure side of which is fluidly connected or connectable to the powder inlet of a powder spraying device. According to this aspect of the present disclosure, it is provided for a docking unit to be allocated to the pump unit, via which the suction side of the at least one powder pump can be fluidly connected as needed to the interior of the powder container.

The docking unit is preferably vertically movable as needed relative to the pump unit and relative to the powder container for fluidly connecting or disconnecting the suction side of the at least one powder pump to or respectively from the interior of the powder container.

For example, the powder container can have at least one intake duct, preferably formed in an inlet tube, which has an intake opening that empties into the interior of the powder container, and an oppositely disposed delivery opening which ends at a connection, wherein the suction side of the at least one powder pump can be fluidly connected to the powder container connection via the docking unit. Conceivable in this context is for the connection to be arranged in an upper region and in particular in a top cover region of the powder container, and namely in such a way that the connection is fluidly connectable to the suction side of the at least one powder pump of the pump unit via the docking unit.

According to embodiments, the docking unit has a first connection assigned to the suction side of the at least one pump unit and at least one second connection assigned to the powder container, wherein the first connection is fluidly connected to the second connection via a line section, and wherein the line section is flexibly realized in such a manner that the second connection can be moved a predefined distance relative to the first connection. The predefined distance in particular corresponds at least substantially to a vertical distance between the second connection of the docking unit and a connection of the powder container.

Pursuant to embodiments of the docking unit according to the present disclosure, the second connection of the docking unit is of complementary design to a connection of the powder container to the extent of it being able to be connected to the powder container connection such that the at least one powder pump of the pump unit can be fluidly connected to a corresponding intake opening of an intake duct allocated to the powder container. For example, the second connection of the docking unit and/or the connection of the powder container is/are preferably designed as a self-closing hose coupling, in particular a bayonet coupling.

It is conceivable for a cleaning station to also be provided for cleaning the at least one pump unit and/or a line system leading from the pump unit to at least one powder spraying device and/or at least one powder spraying device when required, in particular when changing from a first type of powder to a differing second type of powder. The docking unit allocated to the pump unit is preferably configured to fluidly connect the suction side of the at least one powder pump to a cleaning connection of the cleaning station as needed.

According to embodiments of the disclosed docking unit, the docking unit and/or the at least one powder container can preferably be vertically moved relative to each other. Expedient in this context is for the docking unit to be allocated a vertical guide unit for moving the docking unit or parts thereof in the vertical direction when needed.

The present disclosure further relates to a multicolor powder center for supplying at least one powder spraying device with different types of coating powder as required, wherein the multicolor powder center comprises at least one powder container for accommodating coating powder and at least one pump unit having at least one powder pump, in particular a dense phase or thin stream powder pump, the pressure side of which is fluidly connected or connectable to the powder inlet of a powder spraying device. According to this aspect, it is in particular provided for the at least one powder container to have at least one intake duct, preferably formed in an inlet tube, which has an intake opening that empties into the interior of the powder container, and an oppositely disposed delivery opening which ends at a connection, wherein the suction side of the at least one powder pump can be fluidly connected to the powder container connection.

Conceivable in this context is for the connection to be arranged in an upper region and in particular in a top cover region of the powder container, and namely in such a way that the connection is fluidly connectable to the suction side of the at least one powder pump of the pump unit.

The at least one intake duct is formed in a dip tube extending into the interior of the at least one powder container or in a side wall of the at least one powder container.

According to embodiments of the disclosed multicolor powder center, the at least one powder container comprises a substantially rectangular or cylindrical powder chamber for coating powder and a fluidizing device for introducing fluidizing compressed air into the powder chamber. At least one inlet opening emptying into the interior of the powder container can be provided in a side wall or in a top cover of the at least one powder container for the supplying of coating powder as needed during a powder coating operation of the multicolor powder center or for selectively introducing compressed cleaning air during a cleaning operation of respectively the multicolor powder center or the at least one powder container.

Of advantage is the further providing of at least one outlet leading out of the interior of the at least one powder container for the discharging of the fluidizing compressed air introduced into the powder chamber of the at least one powder container for alternatively discharging cleaning air introduced into the powder chamber during a cleaning operation together with, where applicable, the residual powder carried along by the cleaning compressed air.

The powder chamber of the at least one powder container preferably has at least one fluidizing compressed air outlet with an outlet opening for discharging the fluidizing compressed air introduced into said powder chamber. The fluidizing compressed air outlet can comprise a vent line which is connected or connectable to a riser pipe outside of the powder container so as to prevent the discharge of powder from the powder chamber of the at least one powder container during a powder coating operation of the multicolor powder center. Conceivable in this context is for the at least one fluidizing compressed air outlet to have a vent line which is connected or connectable on one side to the outlet opening of the fluidizing compressed air outlet and which empties on the other side into a suction funnel of a suction unit preferably designed as an air flow amplifier.

At least one level sensor is preferably further provided for detecting at least one powder level inside the at least one powder container. The at least one level sensor is in particular a non-contact level sensor separately arranged from the interior of the powder container outside of the powder container.

The powder containers can be fixed and adjoining self-cleaning containers or individual movable or portable powder containers. Particularly conceivable in this context is for the powder containers to be integrated into an automatic powder feeding system so that commensurate coating powder can be supplied automatically, or alternatively automatically upon need, to the powder containers. The powder feeding system can for example be realized as a paternoster system.

Each powder container can be provided with the following functions:

level sensor for level monitoring and corresponding communication;

powder fluidizing/preconditioning upon a change in powder type so that powder is conveyed immediately after docking;

integration of a sieve;

integration of a vibration unit;

sensor system for detecting the correct positioning of the powder container;

code plate, barcode, RFID card or the like for detecting and/or identifying the powder container or its content respectively;

connection to a larger fresh powder container (e.g. Big-Bag station) external of the multicolor center for the automatic replenishing of powder; and/or connection to a powder recirculation system.

Conceivable in this context is for the multicolor powder center to be allocated a recovery powder recirculation system for refeeding recovery powder into the first powder container and/or the at least one second powder container as required. The recovery powder recirculation system can comprise at least one return line, particularly in the form of a return hose, which is in particular fluidly connected or connectable on one side to a powder coating booth or coating workstation and the first powder container and/or the at least one second powder container for refeeding recovery powder into the respective powder container when needed. The at least one return line is preferably movable on a carriage or slide assembly, in particular horizontally, relative to the first powder container and/or the at least one second powder container.

Furthermore, the at least one return line can be movable, in particular vertically, relative to the first powder container and/or at least one second powder container in order to form a fluidic connection with the respective powder container.

According to embodiments, the multicolor powder center is allocated a powder container venting system for venting the first powder container and/or the at least one second powder container as needed. The powder container venting system can comprise at least one vent line, particularly in the form of a venting hose, which is in particular fluidly connected when needed or permanently to the first powder container and/or the at least one second powder container for venting the respective powder container. Here, too, it is advantageous for the at least one vent line to be movable on a carriage or slide assembly, in particular horizontally, relative to the first powder container and/or the at least one second powder container.

The size of the powder container is preferably 5 to 150 liters depending on the type of container.

Further powder provisionings such as devices for conveying directly from a powder box or powder barrel are conceivable.

According to embodiments of the powder containers used in the disclosed multicolor center, each are equipped with a vibrating sieve device for spray coating powder. The vibrating sieve device can comprise a sieve and a vibrator for vibrating the sieve. The vibrator is designed for example as a compressed air vibrator or ultrasonic sieve.

In a further development, at least one device is in particular provided for measuring the air pressure prevailing within the interior of the at least one powder container.

Advantageous in this context is for:

the volume of fluidizing compressed air supplied to the at least one powder container per unit of time to be able to be regulated, preferably automatically, as a function of the air pressure prevailing in the interior of the at least one powder container; and/or the volume of cleaning compressed air supplied to the at least one powder container per unit of time to be able to be regulated, preferably automatically, as a function of the air pressure prevailing in the interior of the at least one powder container; and/or the volume of fluidizing compressed air discharged per unit of time from the at least one powder container to be able to be regulated, preferably automatically, as a function of the air pressure prevailing in the interior of the at least one powder container; and/or the volume of cleaning compressed air discharged per unit of time via at least one residual powder outlet to be able to be regulated, preferably automatically, as a function of the air pressure prevailing in the interior of the at least one powder container.

BRIEF DESCRIPTION OF THE DRAWINGS

The following will reference the accompanying drawings in describing exemplary embodiments of the solution according to the present disclosure.

The drawings show:

FIG. 2a a schematic and isometric detailed view of a pump unit as used in the exemplary embodiment according to FIG. 1a;

FIG. 3a a further schematic and isometric detailed view of a pump unit as used in the exemplary embodiment according to FIG. 1a;

DETAILED DESCRIPTION

Figure 1A:
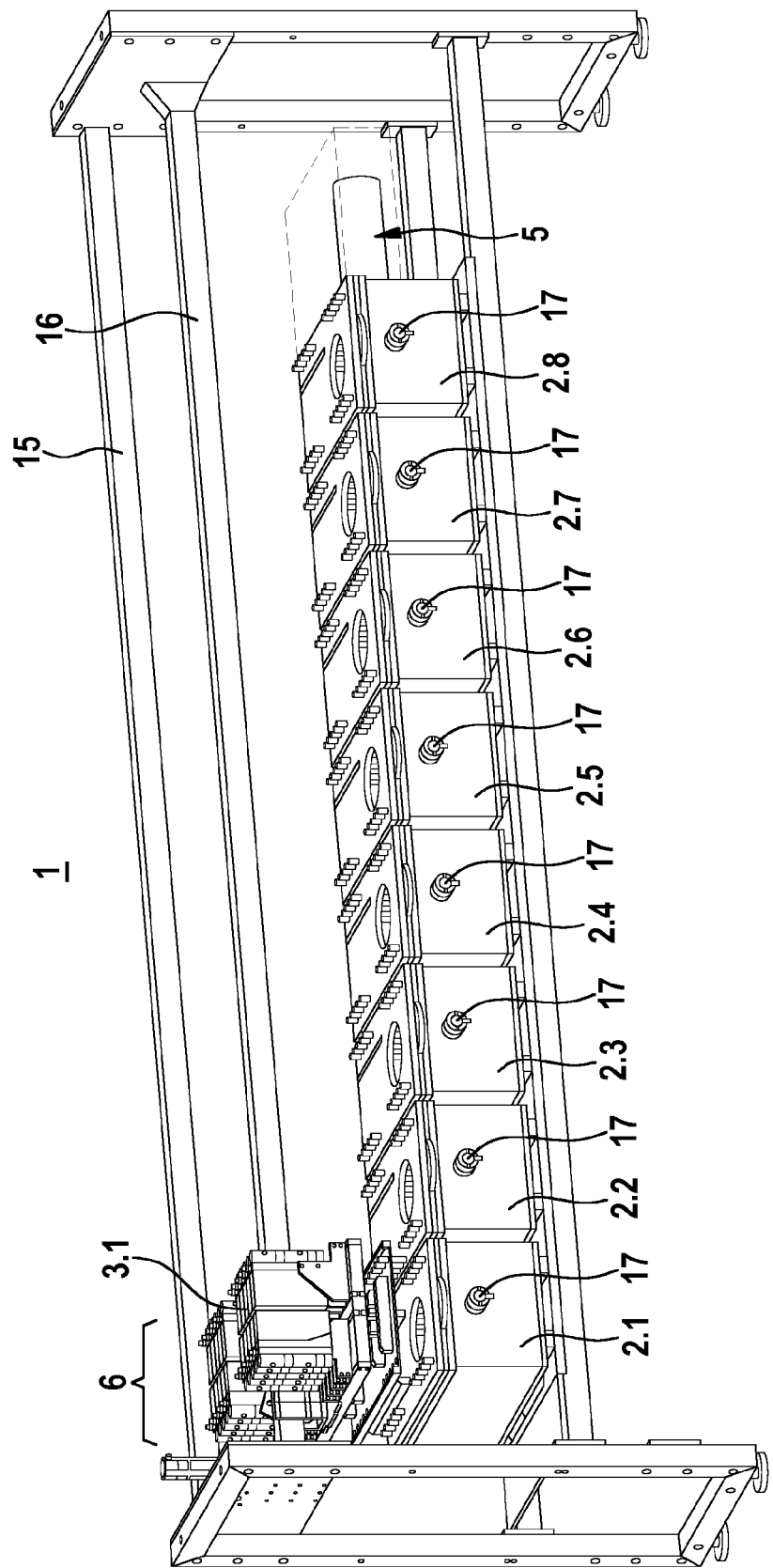
FIG. 1a a schematic and isometric view of a first exemplary embodiment of the multicolor powder center according to the present disclosure.
Figure 1B:
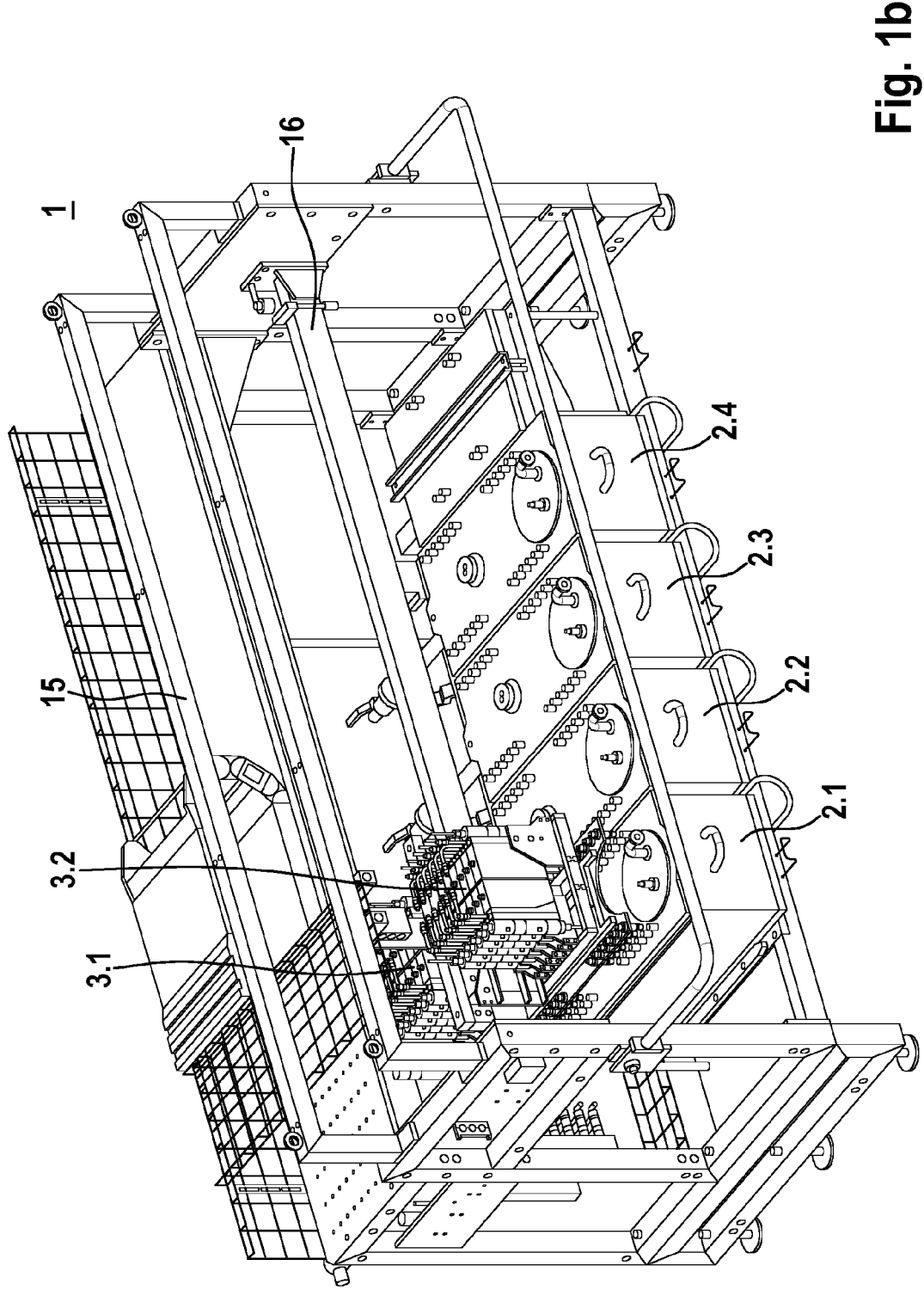
FIG. 1b a schematic and isometric view of a second exemplary embodiment of the multicolor powder center according to the present disclosure.
Figure 2A:
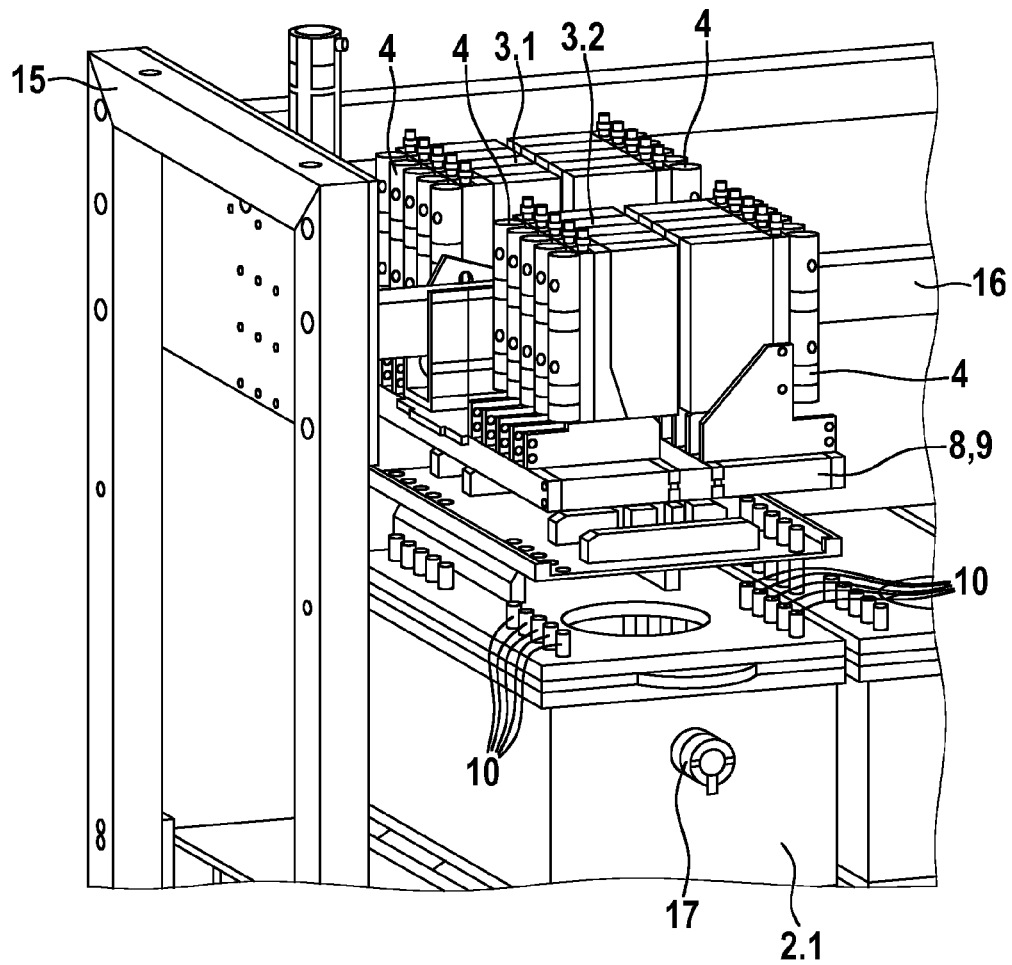
Figure 2B:
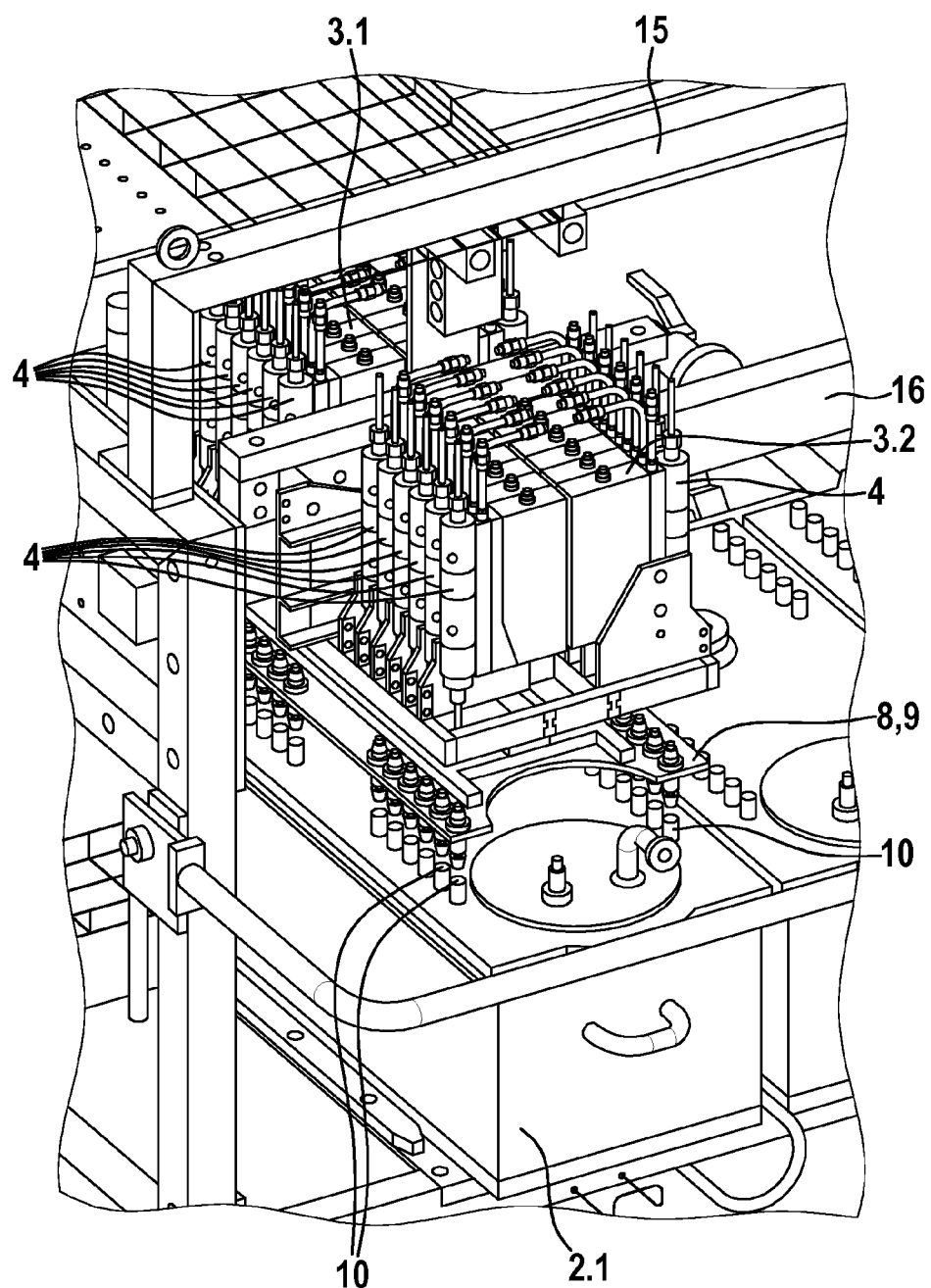
FIG. 2b a schematic and isometric detailed view of a pump unit as used in the exemplary embodiment according to FIG. 1b.
Figure 3A:
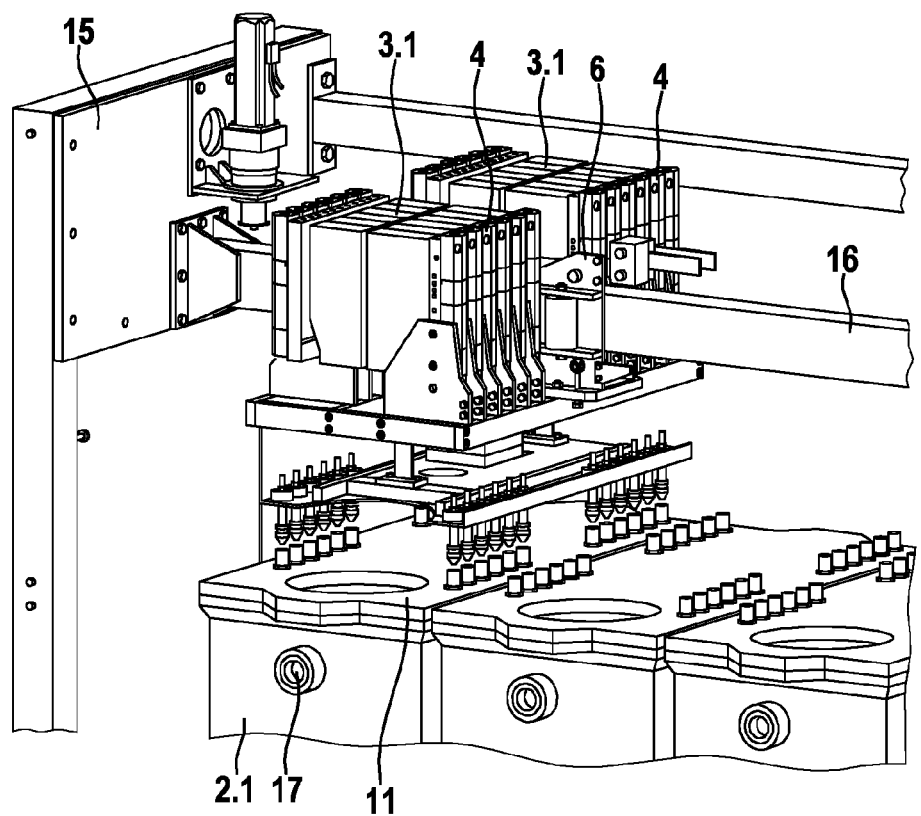
Figure 3B:
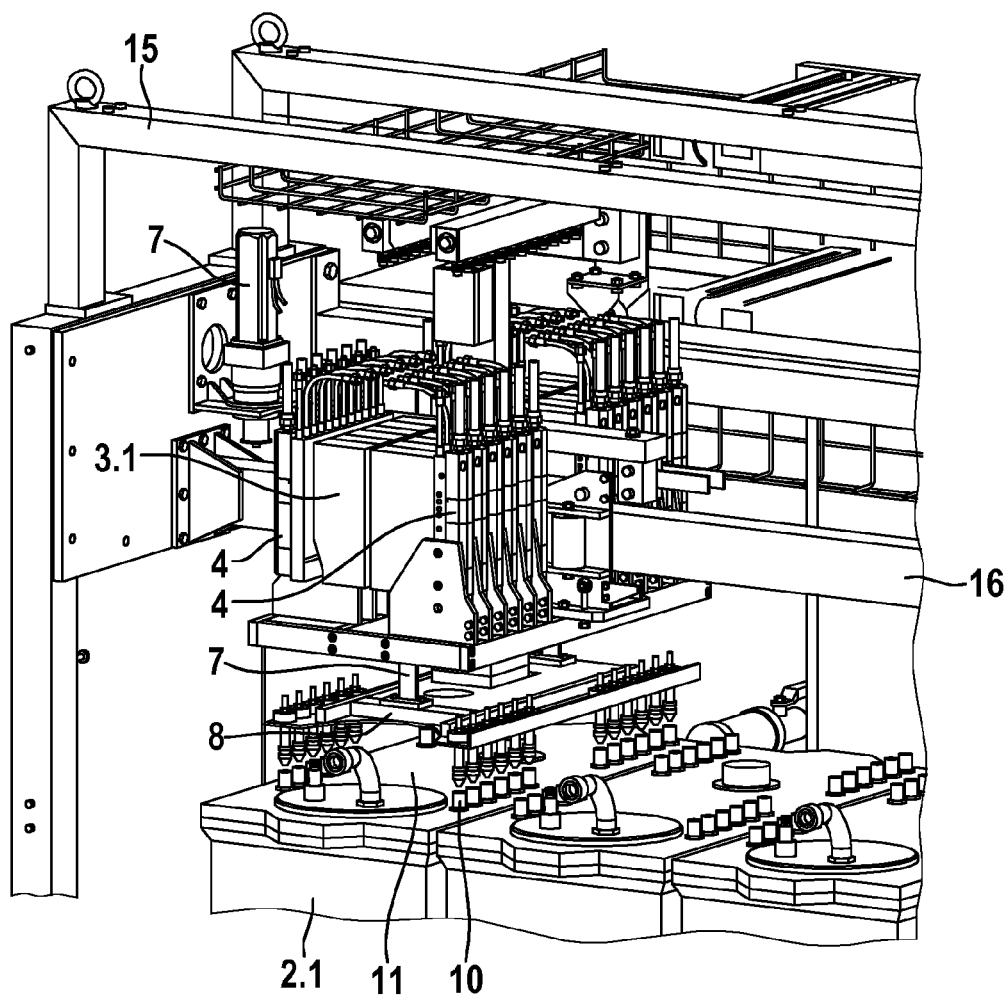
FIG. 3b a further schematic and isometric detailed view of a pump unit as used in the exemplary embodiment according to FIG. 1b.
Figure 4:
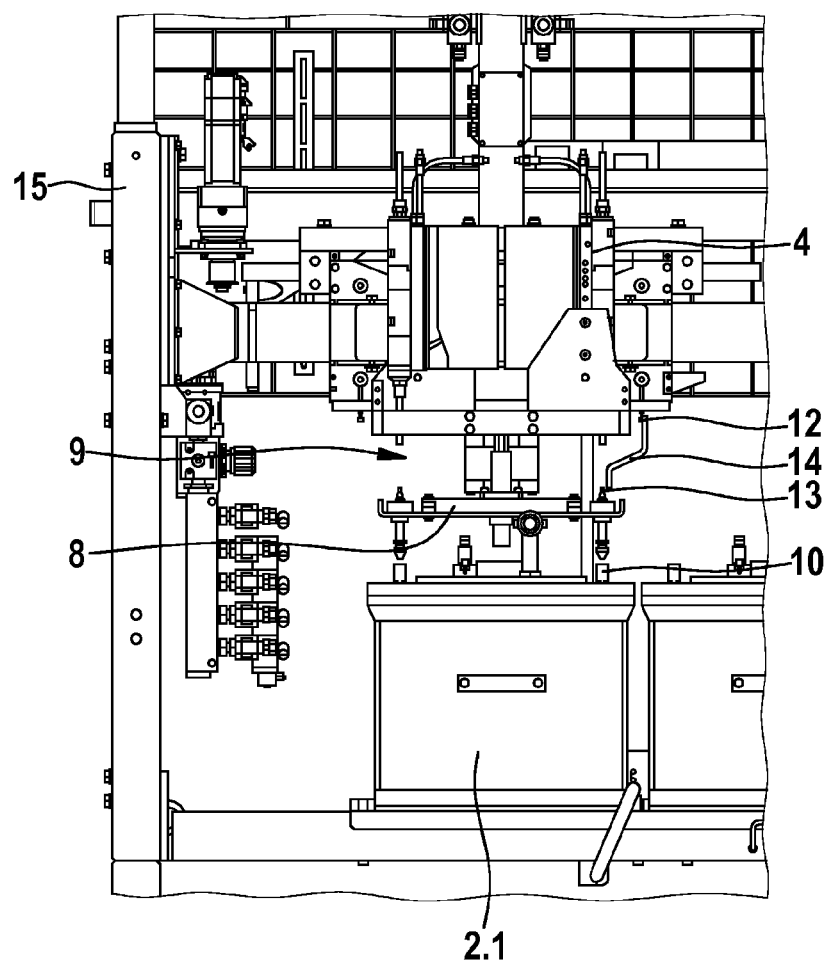
FIG. 4 a schematic and side view of the pump unit according to FIG. 2b.

FIG. 1a and FIG. 1b each depict schematic and isometric views of exemplary embodiments of the disclosed multicolor powder center 1.

Briefly summarized, each exemplary embodiment of this multicolor powder center 1 comprises a plurality of powder containers 2.1-2.8 (for example eight in FIG. 1a), which are designed to accommodate different types of coating powders. According to the depicted embodiment, each of the plurality of powder containers 2.1-2.8 comprises a substantially rectangular powder chamber for accommodating the corresponding coating powder.

The structure of the exemplary embodiments of the disclosed multicolor powder center 1 is specifically that of a frame 15 having multiple adjoining powder containers 2.1-2.8 and a moving carriage (carriage/slide assembly 6) above the powder containers 2.1-2.8 which consists of a plurality of powder pumps 4 (here: dense phase pumps) integrated into a pump unit 3.1-3.6 and a vertically moving docking unit 8 with a corresponding docking plate 9.

The powder containers 2.1-2.8 are usually filled with different types of powder. The powder containers 2.1-2.8 are designed so as to be removable from the row of containers. Guides and the like ensure that the position of the powder container is centered and indexed. All of the powder containers 2.1-2.8 are connected to a central suction device which vents excess pressure in the powder containers 2.1-2.8 caused by fluidization of the powder. In addition to its capping function, the top cover 11 of each powder container 2.1-2.8 has integrated inlet tubes with docking interfaces situated at the upper end (connections 10).

The driven and precisely positionable carriage (carriage/slide assembly 6) with the pump unit 3.1-3.6 and the docking unit 8 travels along a guide rail 16 and positions precisely above a powder container 2.1-2.8. A vertical movement of the entire docking plate 9 of the docking unit 8 connects the inlet sides of the powder pumps 4 to the inlet tubes of the powder containers 2.1-2.8; the latter preferably being a self-centering structure.

Although not shown in the drawings, multiple powder spray guns can thus be simultaneously connected to one powder container 2.1-2.8. The powder pumps 4 then start to convey powder from the powder container 2.1-2.8 toward the guns.

When changing the powder (color change), the mechanism undocks from the "old" powder container 2.1-2.8 and the carriage (carriage/slide assembly 6) travels into a cleaning position in which the powder-conveying components (in the direction of the gun as well as the suction hose) are cleaned. Afterwards, the "new" powder container 2.1-2.8 is approached.

The constant powder conveyance quality is achieved by the advantages of a dense phase pump in particular and its integration into the system with the shortest possible intake distances.

FIG. 1a shows one embodiment example having a total of eight powder containers 2.1-2.8. An implementation with fewer, up to only two powder containers is also conceivable. Thus, FIG. 1b for example shows an embodiment having a total of four powder containers 2.1-2.4.

Figure 5A:
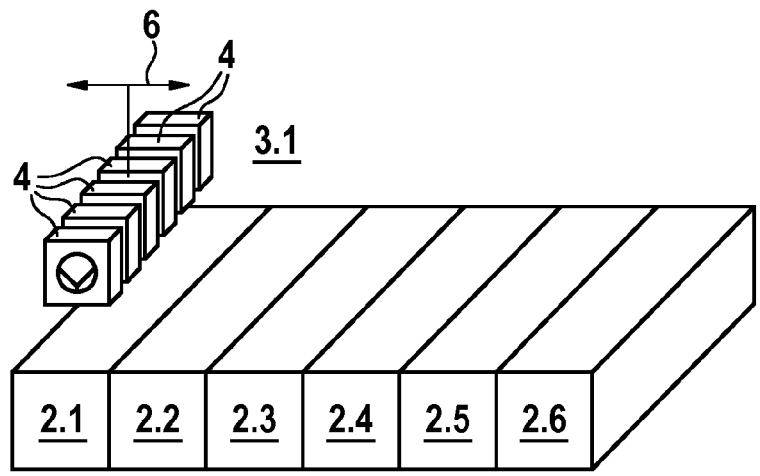
FIG. 5a-d further exemplary embodiments of the disclosed multicolor powder center shown schematically.
Figure 5B:
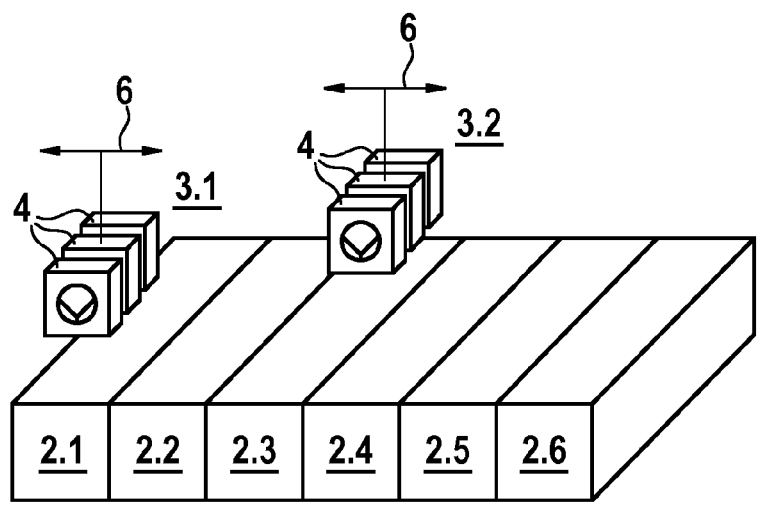
Figure 5C:
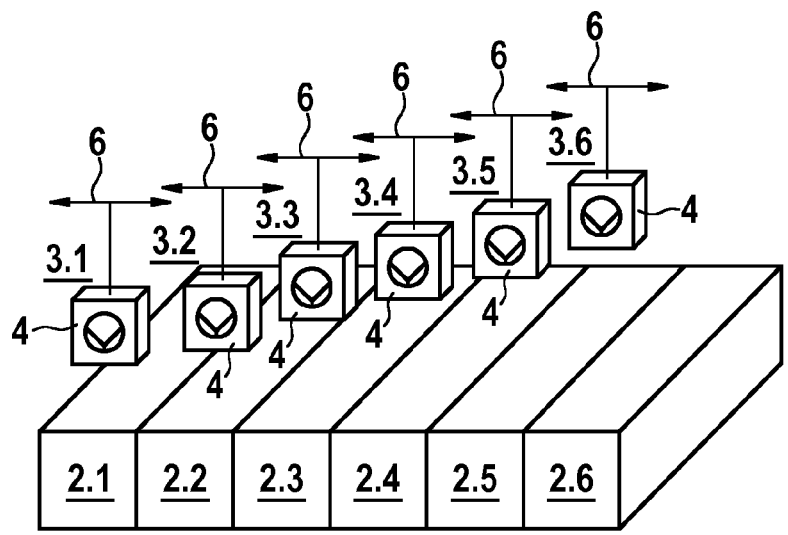
Figure 5D:
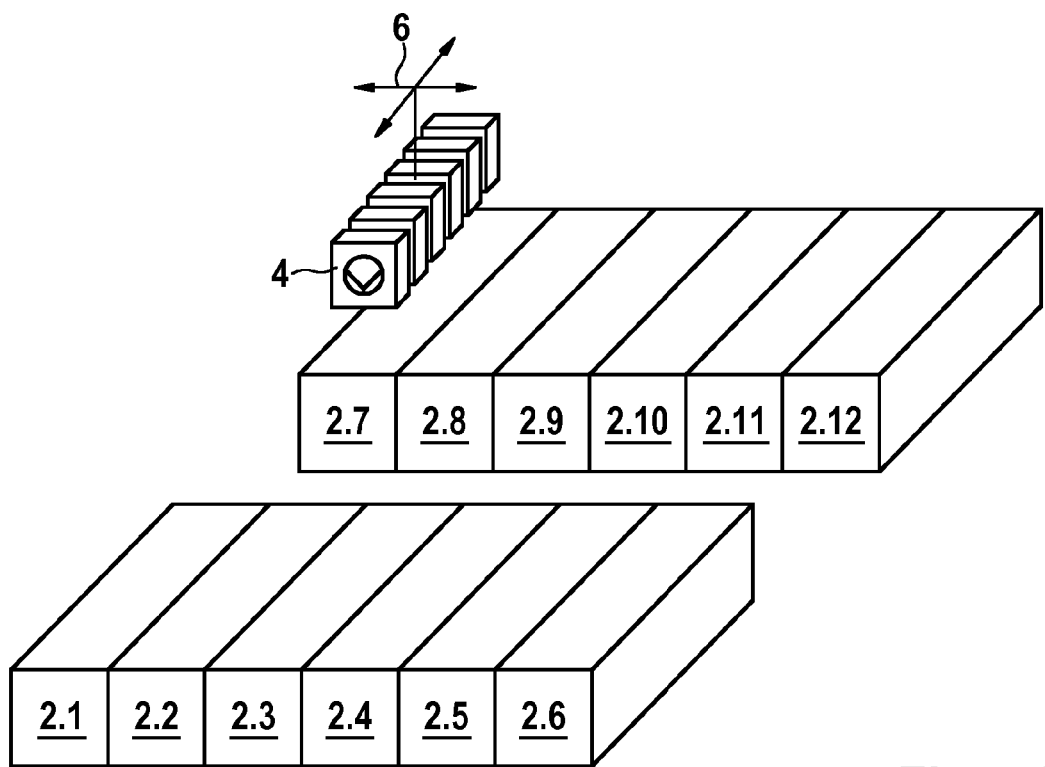

Particularly when there are more than for example ten powder containers, a second and further row can be positioned parallel to the first row of containers (see FIG. 5d). The rows of containers are in this case secured to the floor on a separate support and the frame 15 with the carriage (carriage/slide assembly 6) becomes the portal; i.e. is equipped with another drive and travels in the X direction to the corresponding row of containers.

The variant schematically shown in FIG. 5a is designed pursuant to the design of FIG. 1 in which a pump unit 3.1 (or gun respectively) makes use of a single type of powder. One (single) slide assembly 6 is therefore needed.

The variant schematically shown in FIG. 5b allows groups to be formed: a first group of pump units 3.1, or a first pump unit 3.1 respectively, makes use of one type of powder and a further group of pump units 3.2, or a further pump unit 3.2 respectively, makes use of a different or the same type of powder at the same time. To that end, two slide assemblies 6 are necessary in this example. The practical application behind this is one multicolor powder center 1 supplying for example two spray booths.

In the variant schematically shown in FIG. 5c, each individual pump unit 3.1-3.6 (or gun respectively) can be assigned to an individual type of powder. To that end, one slide assembly 6 is required for each pump unit 3.1-3.6. In practical applications, manual spray guns are hence generally used to coat small quantities (e.g. individual metal furniture components processed according to the FIFO principle and thus having different color requirements).

For a large number of powder containers 2.1-2.12, types of powder respectively, the entire pump unit 3.1 as schematically shown in FIG. 5d can additionally be moved to a further row of powder containers.

Although not depicted in the drawings, at least one cleaning compressed air inlet can be provided in a side wall of each powder container 2.1-2.12, to which a compressed air source can be connected during a cleaning operation of the powder container 2.1-2.12 for removing residual powder from the corresponding powder chamber via a compressed air line in order to introduce cleaning compressed air into the powder chamber. Further conceivable is the providing of a residual powder outlet on the already mentioned side wall or the floor of the respective powder container 2.1-2.12 which has an outlet opening through which residual powder can be forced out of the powder chamber with the aid of the cleaning compressed air introduced into the powder chamber during the cleaning operation of the powder container 2.1-2.12.

The respective powder containers 2.1-2.12 of the exemplary embodiment of the disclosed multicolor powder center 1 depicted in the drawings preferably further comprise an inlet opening for the supply of fresh powder and/or recovery powder as needed. It is of course also conceivable in this context to provide a respective separate powder inlet for fresh powder and for recovery powder in each case.

The respective powder containers 2.1-2.12 of the exemplary embodiment of the disclosed multicolor powder center 1 are preferably each allocated a fluidizing device for introducing fluidizing compressed air into the corresponding powder chamber. The fluidizing compressed air can be introduced into the corresponding powder chamber through an end wall, longitudinal side wall, bottom wall or cover wall. Particularly expedient is for the bottom wall of the respective powder chamber to be designed as a fluidizing bed. The fluidizing bed should have multiple open pores or small passage openings, through which fluidizing compressed air can flow upward into the corresponding powder chamber from a fluidizing compressed air chamber disposed below the bottom wall in order to propel the coating powder therein into a state of suspension (i.e. fluidize) during the powder coating operation of the multicolor powder center 1 so that it can be easily extracted with the aid of a powder delivery device in the form of a pump unit 3.1-3.6. The fluidizing compressed air is fed to the fluidizing compressed air chamber through a fluidizing compressed air inlet.

So that the pressure within the respective powder chamber does not exceed a predefined or definable maximum pressure during the operation of the fluidizing device, each powder chamber of the multicolor powder center 1 comprises at least one fluidizing compressed air outlet having an outlet opening for discharging the fluidizing compressed air introduced into the powder chamber and for effecting pressure equalization. The outlet opening of the at least one fluidizing compressed air outlet of each powder chamber of the plurality of powder containers 2.1-2.12 should in particular be dimensioned such that a maximum overpressure of 0.5 bar relative to the atmospheric pressure prevails in the corresponding powder chamber during the operation of the fluidizing device.

A valve or the like can also be affixed to the outlet opening in order to vent only the powder containers which are under fluidization pressure.

A central vent line connecting the powder chambers, which leads to a central suction unit, is preferably provided to discharge the fluidizing compressed air introduced into the respective powder chambers of the powder containers 2.1-2.12.

In the schematically depicted exemplary embodiment of FIG. 1a, each powder container 2.1-2.8 has a preferably non-contact level sensor 17 in order to detect the maximum permissible powder level in the respective powder chamber. Thereby conceivable is for a further level sensor 17 to be provided, which is arranged with respect to the powder container 2.1-2.12 so as to detect a minimum powder level, and as soon as the powder reaches or drops below said minimum powder level, a corresponding message is sent to a control device to supply fresh powder or recovery powder to the corresponding powder chamber via an inlet opening, preferably automatically.

The level sensor 17 for detecting the powder level in the corresponding powder chamber is preferably a non-contact level sensor 17 and is arranged separately therefrom outside of the powder chamber. This thereby prevents contamination of the level sensor 17. The level sensor 17 generates a signal when the powder level reaches a certain height. Multiple such powder level sensors can also be arranged at different heights, for example for detecting predetermined maximum levels and for detecting a predetermined minimum level.

The signals of the at least one level sensor 17 are preferably used to control an automatic powder feed of coating powder into the respective powder chambers through corresponding powder inlets in order to maintain a predetermined level or predetermined level range therein even during the period when the pump unit 3.1-3.6 is extracting coating powder from the corresponding powder chamber and pneumatically conveying it to powder spraying devices or a single powder spraying device (or into other containers).

During such a powder spray coating operation, cleaning compressed air is not conducted into the corresponding powder chambers, or only at reduced pressure.

Although not explicitly depicted in the drawings, it is further conceivable for a device to be provided for measuring or determining the air pressure prevailing in the respective powder chambers. This is important insofar as ensuring that no excess pressure can build up inside the corresponding powder containers 2.1-2.12 from the introducing of fluidizing compressed air during the powder coating operation of the multicolor powder center 1, since the powder containers 2.1-2.12 are generally not designed as highpressure containers. It is insofar preferential for the maximum allowable overpressure in the powder chamber to not exceed the value of 0.5 bar.

Particularly conceivable in the last-mentioned embodiment is for the air pressure measured in the respective powder chamber of the individual powder containers 2.1-2.12 to be fed to a control unit continuously or at predetermined times or upon predetermined events respectively, wherein the volume of fluidizing compressed air supplied per unit of time to the powder chamber and/or the volume of fluidizing compressed air discharged from the powder chamber per unit of time via the at least one fluidizing compressed air outlet is preferably automatically set as a function of the air pressure prevailing within the powder chamber. In contrast, during the cleaning operation of the multicolor powder center 1, it is preferential for the volume of cleaning compressed air supplied to the respective powder chamber per unit of time and/or the volume of cleaning compressed air discharged per unit of time via the at least one residual powder outlet to be preferably automatically set as a function of the air pressure prevailing within the powder chamber with the aid of the control unit.

The disclosed multicolor powder center 1, as shown pursuant to an exemplary embodiment in the accompanying drawings, comprises at least one pump unit 3.1-3.6. In the embodiment depicted by way of example in the drawings, the pump unit 3.1-3.6 comprises a plurality of dense phase powder pumps preferably able to be individually controlled by means of the cited control unit and each having a powder inlet for drawing in coating powder as needed from one of the powder containers 2.1-2.12 as well as a powder outlet. The respective powder outlets of the powder pumps 4 of the pump unit 3.1-3.6 are fluidly connected or connectable in each case to a respective powder spraying device.

As schematically depicted, the pump unit 3.1-3.6 is allocated a carriage or slide assembly 6, via which the pump unit 3.1-3.6 can be movably guided in a horizontal plane and above the respective powder containers 2.1-2.12 relative to same. To that end, the carriage or slide assembly 6 allocated to the pump unit 3.1-3.6 comprises a corresponding linear drive able to be controlled and positioned relative to the respective powder container 2.1-2.12 of the multicolor powder center 1 by means of the cited control unit.

The pump unit 3.1-3.6 is further allocated a vertical guide unit for enabling the vertical moving of the pump unit 3.1-3.6 or parts thereof relative to the powder containers 2.1-2.12 of the multicolor powder center 1 when needed.

According to the embodiment of the disclosed multicolor powder center 1 depicted schematically in the drawings, the pump unit 3.1-3.6 comprises a docking unit 8, via which the powder inlets (suction sides) of the powder pumps 4 associated with the pump unit 3.1-3.6 can be fluidly connected to the interior of one of the powder containers 2.1-2.12 as needed. To that end, a vertical guide unit is allocated to the docking unit 8, by means of which the docking unit 8 can be moved in the vertical direction as required relative to the respective powder pumps 4 of the pump unit 3.1-3.6 and the powder containers 2.1-2.12.

The docking unit 8 is vertically movable as needed relative to the pump unit 3.1-3.6 as well as relative to the powder container 2.1-2.12 for fluidly connecting or fluidly disconnecting the suction side of the at least one powder pump 4 to/from the interior of the powder container 2.1-2.12.

As can be seen from the detailed depictions in FIGS. 2a to 4, the powder containers 2.1-2.8 each have at least one intake duct preferably formed in a inlet tube which has an intake opening emptying into the interior of the powder container 2.1-2.8 and an oppositely disposed delivery opening which ends at a connection 10, wherein the suction side of the at least one powder pump 4 can be fluidly connected to the connection 10 of the powder container 2.1-2.12 via the docking unit 8. The connection 10 is arranged in an upper region and in particular in a top cover region 11 of the powder container 2.1-2.8, and namely in such a way that the connection 10 is fluidly connectable to the suction side of the at least one powder pump 4 of the pump unit 3.1-3.6 via the docking unit 8.

As depicted, the docking unit 8 has a first connection 12 assigned to the suction side of the at least one pump unit 3.1-3.6 and at least one second connection 13 assigned to the powder container 2.1-2.12, wherein the first connection 12 is fluidly connected to the second connection 13 via a line section 14, and wherein the line section 14 is flexibly realized in such a manner that the second connection 13 can be moved a predefined distance relative to the first connection 12. The predefined distance corresponds to a vertical distance between the second connection 13 of the docking unit 8 and a connection 10 of the powder container 2.1-2.12.

The second connection 13 of the docking unit 8 is of complementary design to a connection 10 of the powder container 2.1-2.12 to the extent of it being able to be connected to the connection 10 of the powder container 2.1-2.12 such that the at least one powder pump 4 of the pump unit 3.1-3.6 can be fluidly connected to a corresponding intake opening of an intake duct allocated to the powder container 2.1-2.12.

In particular, the second connection 13 of the docking unit 8 and/or the connection 10 of the powder container 2.1-2.12 is/are designed as a preferably self-closing hose coupling, in particular a self-centering and sealing coupling.

Although not shown in detail in the drawings, it is advantageous for a cleaning station 5 to be further provided in order to be able to clean the pump unit 3.1-3.6 or the component parts of the pump unit 3.1-3.6 respectively when needed, particularly when changing from a first type of powder to a differing second type of powder.

To that end, it is expedient for the pump unit 3.1-3.6 to be movable relative to the cleaning station 5 such that it can be cleaned in the cleaning station 5 when needed and in particular flushed with cleaning compressed air.

Within the scope of this cleaning, it is further conceivable for the cleaning station 5 to not only be able to clean the pump unit 3.1-3.6 and the component parts of the pump unit 3.1-3.6, in particular powder pumps 4, but also the line systems which lead from the pump unit 3.1-3.6, or powder pumps 4 respectively, to the powder spraying devices. Further advantageous is for the cleaning station 5 to also be able to at least partially clean the powder spraying device allocated to the multicolor powder center 1.

Particularly of advantage is for the docking unit 8 assigned to the pump unit 3.1-3.6 to be designed to fluidly connect the suction side of the at least one powder pump 4 to a cleaning connection of the cleaning station 5 when required.

Figure 6:
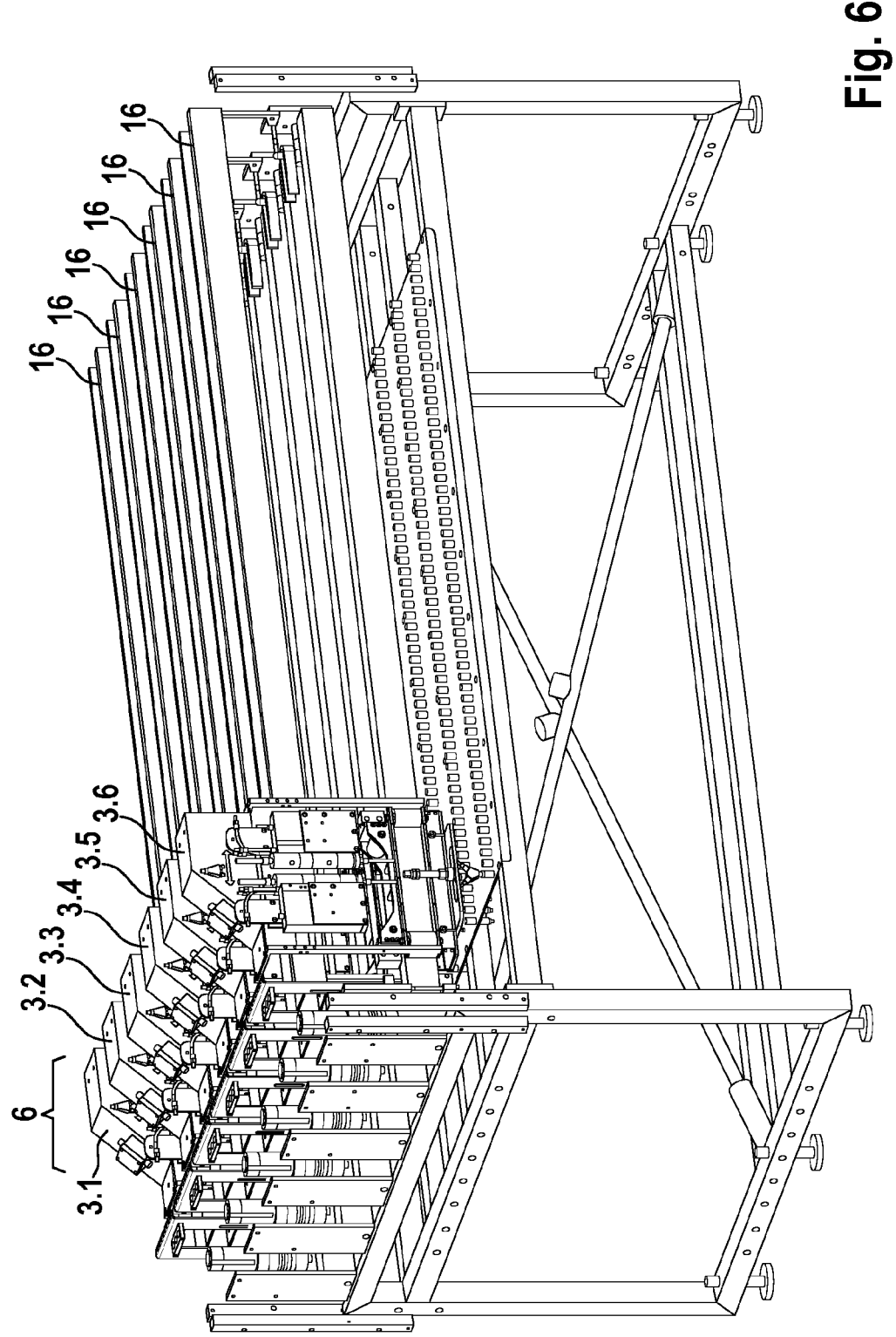
FIG. 6 a schematic and isometric view of a third exemplary embodiment of the disclosed multicolor powder center (without powder containers)

FIG. 6 shows a schematic and isometric view of a further exemplary embodiment of the disclosed multicolor powder center 1, although the powder containers as well as the cleaning station are not depicted for the sake of clarity.

Figure 7:
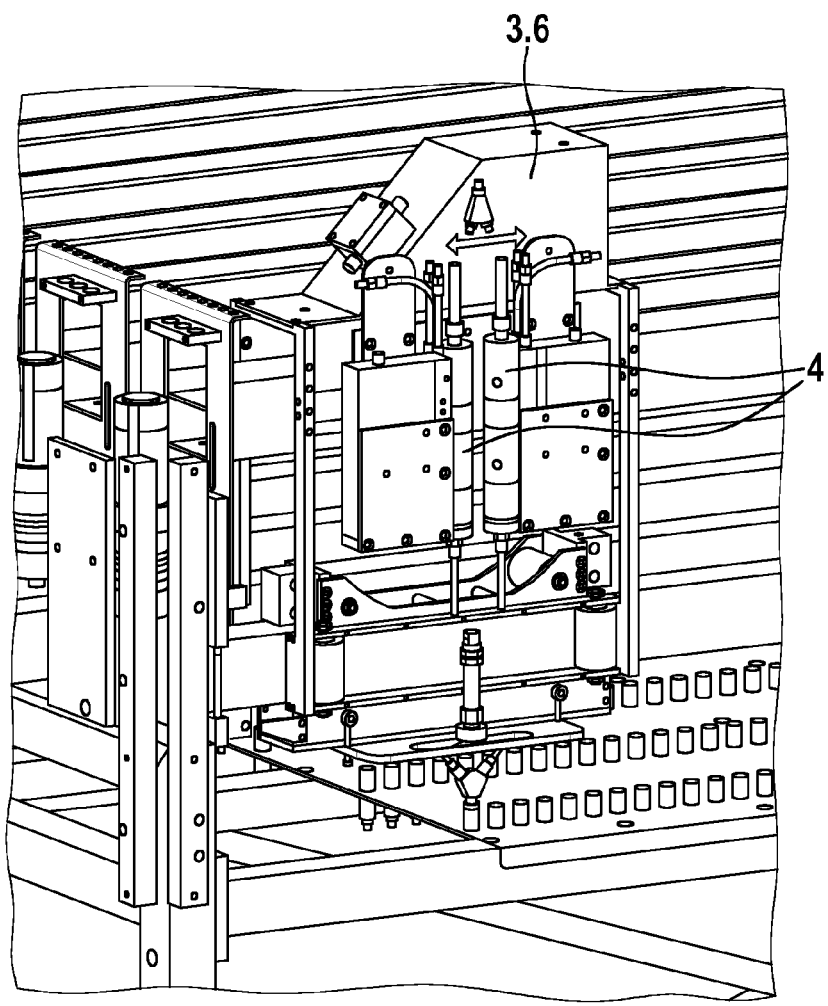
FIG. 7 a schematic and isometric detailed view of a pump unit as used in the exemplary embodiment according to FIG. 6.

FIG. 7 shows a schematic and isometric detailed view of a pump unit 3.1 as used in the exemplary embodiment according to FIG. 6.

Briefly summarized, the disclosed solution is particularly characterized by a very flexible changing of color and in particular during an ongoing coating operation; i.e. in minimum time, whereby the powder feed quality is at the same time ensured. A color change can in particular be realized within a maximum time period of 45 seconds, whereby the multicolor powder center 1 is able to provide a plurality of different colors or types of powder at the same time, for example a total of eight or more powder colors or powder types.

The powder pumps 4 of the pump units 3.1-3.6 ensure that the multicolor powder center 1 can simultaneously supply a plurality of spray coating devices such as powder spray guns, for example. According to preferred implementations of the multicolor powder center according to the present disclosure, up to 24 spray guns are connected to the corresponding powder pumps of the multicolor center.

The individual powder containers are preferably equipped with a fluidizing system, whereby the individual powder containers are vented by way of a preferably centralized venting system.

The invention is not limited to the exemplary embodiments depicted in the drawings but rather yields from an integrated overall consideration of all the features disclosed herein.

Thus, implementations of the disclosed multicolor powder center 1 provide for a recovery powder recirculation system to be allocated to the multicolor powder center 1 for refeeding recovery powder into at least one of the powder containers 2.1-2.12 when required. The recovery powder recirculation system can comprise at least one return line, particularly in the form of a return hose, which in particular is or can be fluidly connected on one side when needed to a powder coating booth or a powder coating workstation and one of the powder containers 2.1-2.12 for refeeding recovery powder into the respective powder container 2.1-2.12.

The at least one return line of the recovery powder recirculation system can be arranged on a carriage or slide assembly so as to be movable, in particular horizontally, relative to the first powder container 2.1-2.12.

Alternatively or additionally thereto, the at least one return line can be movable, in particular vertically, relative to the powder containers 2.1-2.12 in order to form a fluidic connection with the respective powder container 2.1-2.12.

Also conceivable is for the multicolor powder center 1 to be allocated a powder container venting system for venting the powder containers 2.1-2.12 as needed. The powder container venting system can comprise at least one vent line, particularly in the form of a venting hose, which is in particular fluidly connected as needed or permanently to the powder containers 2.1-2.12 for venting the powder containers 2.1-2.12. The at least one vent line can thereby be movable on a carriage or slide assembly, in particular horizontally, relative to the powder containers 2.1-2.12.

The invention claimed is:

1. A multicolor powder center for supplying at least one powder spraying device with different types of coating powder as required, wherein the multicolor powder center comprises the following:
   a first powder container for accommodating a first type of coating powder;
   at least one second powder container for accommodating a second type of coating powder; and
   at least one pump unit having at least one powder pump comprising a dense phase powder pump or thin stream powder pump, a pressure side of which is fluidly connected or connectable to a powder inlet of a powder spraying device;
   wherein the at least one pump unit and/or the first powder container and the at least one second powder container are movable relative to each other such that a suction side of the at least one powder pump is fluidly connected or connectable to either an interior of the first powder container or an interior of the at least one second powder container; and
   wherein the at least one pump unit is allocated a first vertical guide unit for vertical moving of the at least one pump unit or parts thereof.

2. The multicolor powder center according to claim 1, wherein a cleaning station is further provided for cleaning the at least one pump unit, and/or a line system leading from the at least one pump unit to at least one powder spraying device, and/or at least one powder spraying device including when changing from the first type of coating powder to the second type of coating powder.

3. The multicolor powder center according to claim 2, wherein the at least one pump unit is movable relative to the cleaning station such that the at least one pump unit can be cleaned in or at the cleaning station flushed with cleaning compressed air; or
   wherein the cleaning station is movable relative to the at least one pump unit such that the pump unit can be cleaned in or at the cleaning station and flushed with cleaning compressed air.

4. The multicolor powder center according to claim 2, wherein the first powder container and the at least one second powder container and the cleaning station are linearly and adjacently arranged.

5. The multicolor powder center according to claim 2, wherein the at least one pump unit and/or the cleaning station is allocated a drive for moving the at least one pump unit relative to the cleaning station such that the at least one pump unit can be cleaned in or at the cleaning station flushed with cleaning compressed air.

6. The multicolor powder center according to claim 1, wherein the at least one pump unit is allocated a carriage or slide assembly, by means of which the at least one pump unit can be movably guided in a horizontal plane and above the first powder container and the at least one second powder container as well as relative thereto.

7. The multicolor powder center according to claim 1, wherein the at least one pump unit comprises a docking unit via which the suction side of the at least one powder pump can be fluidly connected to the interior of one of the first powder container and the at least one second powder container.

8. The multicolor powder center according to claim 7, wherein the docking unit is allocated a second vertical guide unit, by means of which the docking unit is vertically movable relative to the at least one powder pump of the at least one pump unit and the first powder container and the at least one second powder container.

9. The multicolor powder center according to claim 1, wherein the first powder container and/or the at least one second powder container is allocated a linear drive, for moving the first powder container and/or the at least one second powder container relative to the at least one pump unit.

10. The multicolor powder center according to claim 1, wherein the first powder container and/or the at least one second powder container are each able to be moved relative to the at least one pump unit independently of one another.

11. The multicolor powder center according to claim 1, wherein at least one powder pump of the at least one pump unit is independently operable, and is arranged in the at least one pump unit such that in a state during which the at least one pump unit is coupled to the first powder container and/or the at least one second powder container or a cleaning station, the at least one powder pump is connected on the suction side to the interior of the first powder container and/or the at least one second powder container or the cleaning station.

12. The multicolor powder center according to claim 1, wherein the at least one pump unit comprises a first and at least one second pump unit, each comprising at least one powder pump that comprises a dense phase powder pump, wherein the first and second pump units are movable relative to the first powder container and the at least one second powder container independently of one another such that:
the suction side of the at least one powder pump of the first pump unit and the suction side of the at least one powder pump of the at least one second pump unit are fluidly connected or connectable to either the interior of the first powder container or the interior of the at least one second powder container.

13. The multicolor powder center according to claim 12, wherein the first and the at least one second pump unit are movable relative to each other and relative to the first powder container and the at least one second powder container in at least one horizontal direction; and/or
wherein the first and the at least one second powder container are movable relative to each other and relative to the first and the at least one second pump unit in at least one horizontal direction.

14. The multicolor powder center according to claim 1, wherein the first and second powder containers are arranged arrayed together in a matrix, and wherein the at least one pump unit is movable in a first horizontal direction and in a second horizontal direction orthogonal to the first horizontal direction relative to the first powder container and the at least one second powder container such that the suction side of the at least one powder pump is fluidly connected or connectable to the interior of one powder container of the first powder container and the at least one second powder container.

15. The multicolor powder center according to claim 1, wherein the first powder container and the at least one second powder container are arranged arrayed together in a matrix, and wherein the first powder container and the at least one second powder container are movable in a first horizontal direction and in a second horizontal direction orthogonal to the first horizontal direction relative to the at least one pump unit such that the suction side of the at least one powder pump is fluidly connected or connectable to the interior of one powder container of the first powder container and the at least one second powder container.

16. The multicolor powder center according to claim 1, wherein the first powder container and the at least one second powder container are arranged arrayed together in a matrix, and wherein the first powder container and the at least one second powder container are movable in a first horizontal direction and the at least one pump unit is movable in a second horizontal direction orthogonal to the first horizontal direction such that the suction side of the at least one powder pump is fluidly connected or connectable to the interior of one powder container of the first powder container and the at least one second powder container.

17. The multicolor powder center according to claim 1, wherein the multicolor powder center is allocated a recovery powder recirculation system for refeeding recovery powder into the first powder container and/or the at least one second powder container.

18. The multicolor powder center according to claim 17, wherein the recovery powder recirculation system comprises at least one return line, in the form of a return hose, which is fluidly connected or connectable on one side to a powder coating booth and the first powder container and/or the at least one second powder container for refeeding recovery powder into a respective powder container.

19. The multicolor powder center according to claim 18, wherein the at least one return line is horizontally movable on a carriage or slide assembly relative to the first powder container and/or the at least one second powder container.

20. The multicolor powder center according to claim 18, wherein the at least one return line is vertically movable relative to the first powder container and/or the at least one second powder container in order to form a fluidic connection with a respective powder container.

21. The multicolor powder center according to claim 18, wherein the at least one vent line is horizontally movable on a carriage or slide assembly relative to the first powder container and/or the at least one second powder container.

22. The multicolor powder center according to claim 1, wherein the multicolor powder center is allocated a powder container venting system for venting the first powder container and/or the at least one second powder container.

23. The multicolor powder center according to claim 22, wherein the powder container venting system comprises at least one vent line, in the form of a venting hose, which is selectively or permanently fluidly connected to the first powder container and/or the at least one second powder container for venting a respective powder container.

24. A multicolor powder center for supplying at least one powder spraying device with different types of coating powder as required, wherein the multicolor powder center comprises the following:
a first powder container for accommodating a first type of coating powder;
at least one second powder container for accommodating a second type of coating powder; and
at least one pump unit having at least one powder pump comprising a dense phase powder pump or thin stream powder pump, a pressure side of which is fluidly connected or connectable to a powder inlet of a powder spraying device;
wherein the at least one pump unit and/or the first powder container and the at least one second powder container are movable relative to each other such that a suction side of the at least one powder pump is fluidly connected or connectable to either-an interior of the first powder container or an interior of the at least one second powder container; and
wherein the first powder container and/or the at least one second powder container is allocated a linear drive, for moving the first powder container and/or the at least one second powder container relative to the at least one pump unit.

25. The multicolor powder center according to claim 24, wherein the first powder container and/or the at least one second powder container are each able to be moved relative to the at least one pump unit independently of one another.

26. The multicolor powder center according to claim 24, wherein at least one powder pump of the at least one pump unit is independently operable, and is arranged in the at least one pump unit such that in a state during which the at least one pump unit is coupled to the first powder container and/or the at least one second powder container or a cleaning station, the at least one powder pump is connected on the suction side to the interior of the first powder container and/or the at least one second powder container or the cleaning station.

27. The multicolor powder center according to claim 24, wherein the at least one pump unit comprises a first and at least one second pump unit, each comprising at least one powder pump that comprises a dense phase powder pump, wherein the first and second pump units are movable relative to the first powder container and the at least one second powder container independently of one another such that:
the suction side of the at least one powder pump of the first pump unit and the suction side of the at least one powder pump of the at least one second pump unit are fluidly connected or connectable to either the interior of the first powder container or the interior of the at least one second powder container.

28. The multicolor powder center according to claim 24, wherein the first and second powder containers are arranged arrayed together in a matrix, and wherein the at least one pump unit is movable in a first horizontal direction and in a second horizontal direction orthogonal to the first horizontal direction relative to the first powder container and the at least one second powder container such that the suction side of the at least one powder pump is fluidly connected or connectable to the interior of one powder container of the first powder container and the at least one second powder container.

29. The multicolor powder center according to claim 24, wherein the first powder container and the at least one second powder container are arranged arrayed together in a matrix, and wherein the first powder container and the at least one second powder container are movable in a first horizontal direction and in a second horizontal direction orthogonal to the first horizontal direction relative to the at least one pump unit such that the suction side of the at least one powder pump is fluidly connected or connectable to the interior of one powder container of the first powder container and the at least one second powder container.

30. The multicolor powder center according to claim 24, wherein the multicolor powder center is allocated a recovery powder recirculation system for refeeding recovery powder into the first powder container and/or the at least one second powder container.

31. The multicolor powder center according to claim 24, wherein the multicolor powder center is allocated a powder container venting system for venting the first powder container and/or the at least one second powder container.

* * * * *